US011403305B2

United States Patent
Martin et al.

(10) Patent No.: US 11,403,305 B2
(45) Date of Patent: Aug. 2, 2022

(54) PERFORMING DATA MINING OPERATIONS WITHIN A COLUMNAR DATABASE MANAGEMENT SYSTEM

(71) Applicant: Open Text Holdings, Inc., San Mateo, CA (US)

(72) Inventors: Carles Bayés Martin, Barcelona (ES); Jesús Malo Poyatos, Barcelona (ES); Marc Rodriguez Sierra, Barcelona (ES); Alejandro Sualdea Pérez, Barcelona (ES)

(73) Assignee: OPEN TEXT HOLDINGS, INC., San Mateo, CA (US)

( * ) Notice: Subject to any disclaimer, the term of this patent is extended or adjusted under 35 U.S.C. 154(b) by 96 days.

(21) Appl. No.: 16/793,856

(22) Filed: Feb. 18, 2020

(65) Prior Publication Data

US 2020/0226134 A1 Jul. 16, 2020

Related U.S. Application Data

(63) Continuation of application No. 15/714,358, filed on Sep. 25, 2017, now Pat. No. 10,606,852, which is a
(Continued)

(51) Int. Cl.
*G06F 16/2458* (2019.01)

(52) U.S. Cl.
CPC ................ *G06F 16/2465* (2019.01)

(58) Field of Classification Search
CPC ............... G06F 17/30463; G06F 17/30539

USPC ... 705/2, 1.1, 36 R, 7.11, 7.25, 14.49, 14.58, 705/304, 305, 310, 322, 348, 35, 37, 4, 705/7.36; 700/83, 17, 259, 11, 253, 275,
(Continued)

(56) References Cited

U.S. PATENT DOCUMENTS 6,041,053 A 3/2000 Douceur
6,941,318 B1 9/2005 Tamayo et al.
(Continued)

OTHER PUBLICATIONS

"Exploiting entity relationship for query expansion in enterprise search", Received: Jun. 13, 2013 / Accepted: Dec. 30, 2013 / Published online: Jan. 10, 2014 (Year: 2013).*
(Continued)

*Primary Examiner* — Irete F Ehichioya
*Assistant Examiner* — Ken Hoang
(74) *Attorney, Agent, or Firm* — Sprinkle IP Law Group

(57) ABSTRACT

Data mining operations are performed within a columnar database management system. The columnar database management system stores input sets of data for a data mining operation. An input set of data is represented as a column of data in the columnar database management system. The columnar database management system stores instructions to perform one or more data mining operations for processing the input sets of data. The columnar database management system receives requests for performing data mining operations and performs the processing of the data mining operation within the columnar database management system. As a result, the processing of data mining operations is performed without requiring multiple data transfers between an application implementing the data mining operations and the columnar database management system.

20 Claims, 6 Drawing Sheets

Related U.S. Application Data continuation of application No. 14/303,581, filed on Jun. 12, 2014, now Pat. No. 9,798,783.

(60) Provisional application No. 61/837,780, filed on Jun. 21, 2013, provisional application No. 61/837,272, filed on Jun. 20, 2013, provisional application No. 61/834,990, filed on Jun. 14, 2013.

(58) Field of Classification Search
USPC ...... 700/49, 66; 707/718, E17.014, E17.005, 707/722, 776, 999.002, E17.001, E17.017, 707/E17.032, E17.082, E17.108, 603, 707/707, 723, 827; 703/1, 13, 6; 706/52, 706/11, 12, 16, 20, 25, 27, 44, 45, 46, 47, 706/54

See application file for complete search history.

(56) References Cited

U.S. PATENT DOCUMENTS

| | | | |
|---|---|---|---|
| 7,031,978 | B1 | 4/2006 | Hornick et al. |
| 7,346,601 | B2 | 3/2008 | Chaudhuri |
| 7,421,660 | B2 | 9/2008 | Charnock et al. |
| 7,945,850 | B2 | 5/2011 | Machalek |
| 9,081,849 | B2 | 7/2015 | Cushing |
| 9,094,258 | B2 | 7/2015 | Broda |
| 9,183,529 | B2 | 11/2015 | Gluzman |
| 9,218,373 | B2 | 12/2015 | Saito |
| 9,405,821 | B1 | 8/2016 | Bessis |
| 9,600,539 | B2 | 3/2017 | Martin et al. |
| 9,607,019 | B1 | 3/2017 | Swift |
| 9,679,000 | B2 | 6/2017 | Martin et al. |
| 9,798,783 | B2 | 10/2017 | Martin et al. |
| 10,282,355 | B2 | 5/2019 | Martin et al. |
| 10,606,852 | B2 | 3/2020 | Martin et al. |
| 10,642,806 | B2 | 5/2020 | Martin et al. |
| 10,970,287 | B2 | 4/2021 | Martin |
| 11,269,830 | B2 | 3/2022 | Martin |
| 2002/0013786 | A1 | 1/2002 | Machalek |
| 2003/0158842 | A1 | 8/2003 | Levy |
| 2004/0153456 | A1 | 8/2004 | Charnock et al. |
| 2007/0088731 | A1 | 4/2007 | Chant |
| 2007/0174252 | A1 | 7/2007 | Rawlings et al. |
| 2009/0019029 | A1 | 1/2009 | Tommaney |
| 2009/0254532 | A1* | 10/2009 | Yang ............... G06F 16/221 |
| 2010/0010986 | A1 | 1/2010 | Icho |
| 2010/0088309 | A1 | 4/2010 | Petculescu et al. |
| 2010/0150342 | A1 | 6/2010 | Richards |
| 2012/0084278 | A1 | 4/2012 | Franke |
| 2012/0310874 | A1 | 12/2012 | Dantressangle |
| 2013/0073513 | A1 | 3/2013 | Kemper |
| 2013/0232176 | A1 | 9/2013 | Plattner |
| 2013/0342542 | A1 | 12/2013 | Brant et al. |
| 2014/0012881 | A1 | 1/2014 | Roesch |
| 2014/0040306 | A1 | 2/2014 | Gluzman Peregrine |
| 2014/0188820 | A1 | 7/2014 | Pederson |
| 2014/0188924 | A1 | 7/2014 | Ma |
| 2017/0249343 | A1 | 8/2017 | Martin et al. |
| 2018/0011909 | A1 | 1/2018 | Martin et al. |
| 2019/0228011 | A1 | 7/2019 | Martin et al. |
| 2020/0250162 | A1 | 8/2020 | Martin |
| 2021/0182286 | A1 | 6/2021 | Martin |
| 2022/0164330 | A1 | 5/2022 | Martin |

OTHER PUBLICATIONS

Notice of Allowance for U.S. Appl. No. 15/595,448, dated Jan. 16, 2020, 2 pgs.
Notice of Allowance for U.S. Appl. No. 16/370,122, dated Nov. 30, 2020, 8 pgs.
Office Action for U.S. Appl. No. 14/307,711, dated May 13, 2016, 16 pgs.
Office Action for U.S. Appl. No. 14/308,971, dated May 18, 2016, 22 pgs.
Office Action for U.S. Appl. No. 14/303,581, dated Jul. 14, 2016, 23 pgs.
Office Action for U.S. Appl. No. 14/303,581, dated Oct. 25, 2016, 31 pgs.
Office Action for U.S. Appl. No. 14/303,581, dated Feb. 16, 2017, 23 pgs.
Office Action for U.S. Appl. No. 15/430,223, dated Oct. 1, 2018, 14 pgs.
Office Action for U.S. Appl. No. 15/595,448, dated Jan. 2, 2019, 26 pgs.
Office Action for U.S. Appl. No. 15/595,448, dated May 10, 2019, 31 pgs.
Notice of Allowance for U.S. Appl. No. 15/714,358, dated Nov. 19, 2019, 6 pgs.
Office Action for U.S. Appl. No. 16/854,520, dated Jul. 7, 2021, 21 pgs.
Notice of Allowance for U.S. Appl. No. 16/854,520, dated Oct. 27, 2021, 2 pgs.
Notice of Allowance for U.S. Appl. No. 17/187,486, dated Apr. 25, 2022, 6 pgs.

* cited by examiner

PERFORMING DATA MINING OPERATIONS WITHIN A COLUMNAR DATABASE MANAGEMENT SYSTEM

CROSS REFERENCE TO RELATED APPLICATIONS

This application is a continuation of, and claims a benefit of priority from, U.S. patent application Ser. No. 15/714,358, filed Sep. 25, 2017, now U.S. Pat. No. 10,606,852, which is a continuation of, and claims a benefit of priority from, U.S. patent application Ser. No. 14/303,581, filed Jun. 12, 2014, now U.S. Pat. No. 9,798,783, which claims a benefit of priority from U.S. Provisional Application No. 61/834,990, filed Jun. 14, 2013, U.S. Provisional Patent Application No. 61/837,272, filed Jun. 20, 2013, and U.S. Provisional Patent Application No. 61/837,780, filed Jun. 21, 2013. All applications referenced in this paragraph are incorporated by reference in their entireties.

TECHNICAL FIELD

This invention relates generally to data mining, and particularly to processing data using data mining operations within a columnar database management system.

BACKGROUND OF THE RELATED ART

Data mining operations are often employed by software application frontends of data mining systems to process data sourced from various database management systems. In particular, software applications typically retrieve data stored by the database management systems, and thereafter perform various calculations on the data according to selected sets of data mining operations (data mining operations are also referred to herein as data mining algorithms). In one aspect, because software applications (representing an application layer) and database management systems (representing a data layer) are logically and often physically distinct entities, processing of data is performed in storage spaces separate from the storage spaces in which the data is stored. As a consequence, performance of data mining processes can frequently be quite poor.

For example, in order to process a data mining request, a software application frontend may transmit a first request for a first set of data to a database management system. In handling the first request, the database management system may authenticate and parse the first request, which delays the overall processing of the data mining request. Upon receiving the first set of data, the software application frontend may generate an intermediate result and thereafter transmit a second request for an additional set of data to the database management system. In handling the second request, the database management system may again authenticate and parse the request, which further delays processing of the data mining request. Finally, after receiving the additional set of data, the database management system processes the additional set and the intermediate result to generate a final result. However, as outlined, generation of such a final result may be relatively slow because several delays associated with request authentication and parsing have been introduced to the data mining process.

SUMMARY OF DISCLOSURE

Embodiments perform data mining operations using a columnar database management system. The columnar database management system stores input sets of data for a data mining operation. An input set of data is represented as a column of data in the columnar database management system. The columnar database management system stores instructions to perform one or more data mining operations for processing the input sets of data. The columnar database management system receives a request to perform a data mining operation on the input sets of data. Responsive to receiving the request, the columnar database management system determines a set of data mining results by performing the following operations. The columnar database management system parses the data mining request within the columnar database management system. The columnar database management system executes a data mining processing plan comprising various steps for processing the requested data mining operation to obtain the results of the requested data mining operation and sends the results obtained to the requestor.

In an embodiment, the data mining processing plan includes at least a step executing another data mining operation. The output of the other data mining operation is provided as input to a subsequent step of the data mining processing plan. The output of the other data mining operation is transferred to the subsequent step within the columnar database system.

Examples of data mining operations performed by the columnar database management system include cross tabulation, generation of Venn diagram, decision tree operation to classify a set of data items into various groups, association rule algorithms, clustering algorithms, and time series algorithm.

The features and advantages described in this summary and the following detailed description are not all-inclusive. Many additional features and advantages will be apparent to one of ordinary skill in the art in view of the drawings, specification, and claims hereof.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. It is noted that wherever practicable similar or like reference numbers may be used in the figures and may indicate similar or like functionality.

Figure 1:
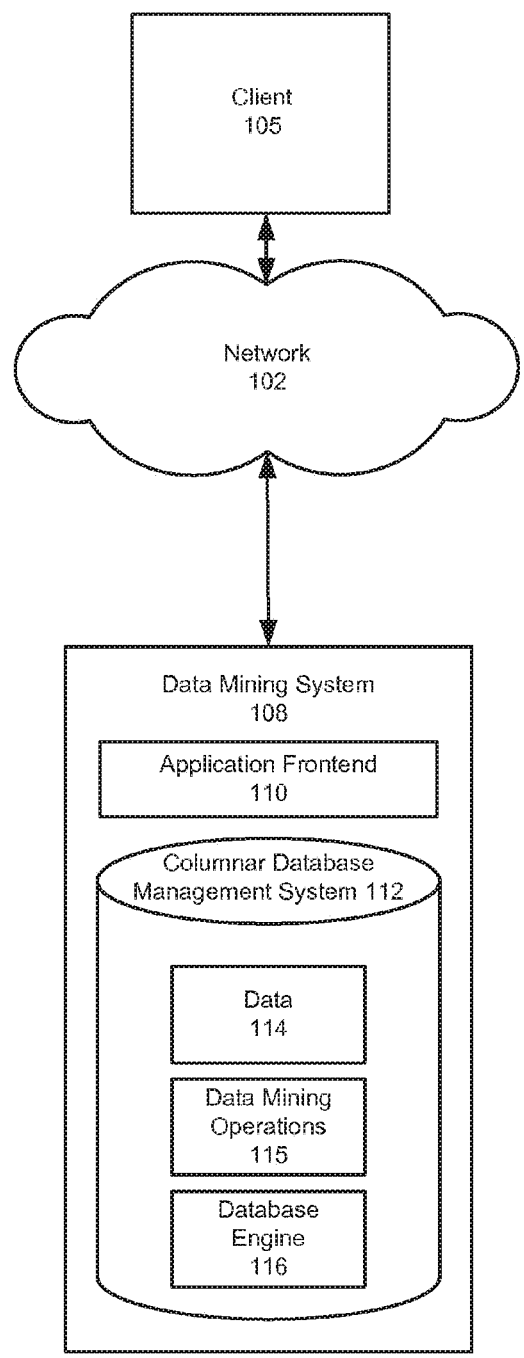
FIG. 1 is a high-level diagram illustrating an environment for data mining according to one embodiment.

FIG. 1 illustrates an example of an environment 100 for performing data mining operations. As shown in FIG. 1, a client 105 is in communication with a data mining system 108 over a network 102. The client 105 is a computing device usable by a user to initiate data mining requests. The data mining requests may indicate to the data mining system 108 to perform one or more data mining operations on data stored by the data mining system 108. In one aspect, the client 105 may be a suitable computing device, such as a desktop computer, a laptop computer, a workstation, a server computer, a mobile phone, a tablet device, etc.

As shown in FIG. 1, the data mining system 108 includes, among other components, an application frontend 110 and a columnar database management system 112. A data mining operation provides new insights into existing data by discovering patterns in the data. Data mining operations analyze large data sets to identify previously unknown patterns or structures in existing data sets. Various tasks classified within data mining include anomaly detection or outlier detection, comprising identifying unusual records that differ from other records in a data set based on certain criteria; clustering, comprising grouping records determined to be similar based on certain criteria; classification, comprising applying existing structure to new data to associate the data with certain categories; regression analysis, comprising determining a model that represents a data set based on criteria that minimize the error between the model and the data set; association, comprising identifying relations between variables, for example, market basket analysis; and summarization, comprising, generating a summary report for a given data set.

The application frontend 110 may be a software application configured to receive data mining requests from the client 105 and/or provide data mining results to the client device 105. In one embodiment, the application frontend 110 may forward or route data mining requests to the columnar database management system 112 for data processing. The application frontend 110 may additionally receive data mining results from the columnar database management system 112 for transmission to a client 105. In one embodiment, the application frontend 110 does not include and/or is not configured to use data mining operations to process data indicated by a data mining request.

The columnar database management system 112 is a system configured to store data according to a column oriented scheme. As shown in FIG. 1, the columnar database management system 112 includes data 114, data mining operations 115, and a database engine 116. In one aspect, data 114 includes various columns of data, where each column is stored as a separate logical set. The data mining operations 115 includes various processes usable for processing the data 114 and generating data mining results based on the processing of the data 114.

The database engine 116 is a logical entity configured to process, create, read, update, and delete data stored by the columnar database management system 112. In one embodiment, the database engine 116 is also configured to perform data mining using the data mining operations 115 and the data 114. In the embodiment, responsive to receiving a data mining request directly from the client 105 or forwarded by the application frontend 110, the database engine 116 performs various steps to process the request including authenticating the request, parsing the request, generating a processing plan for the request, and executing the processing plan for the request. As a result of the processing steps, the database engine 116 generates an end result for the request.

In certain embodiments, the database engine 116 internally performs all or a substantial portion of the processing steps required to generate the end result. In some embodiments, the database engine 116 additionally logs every action that is performed in processing the request, as well as the data that was accessed as part of the actions. Following generation of the end result, the database engine 116 returns the result to the requesting client 105 and/or application frontend 110 for presentation to a user.

In some embodiments, the application frontend 110 and the columnar database management system 112 may be separate logical entities operating on the same physical hardware. In other embodiments, the application frontend 110 and the columnar database management system 112 are separate logical entities operating on different physical hardware. In some embodiments, the application frontend 110 and the columnar database system 112 may utilize at least one different data formatting convention. For example, the application frontend 110 may be operated on physical hardware that supports a Little-Endian format. In contrast, the columnar database management system 112 may be operated on physical hardware that supports a Big-Endian format.

By having the columnar database management system 112 implementing data mining operations rather than the application frontend 110, data mining efficiency can be improved. More specifically, delays related to acquiring data for performing data mining calculations can be reduced since data acquisition and data mining processing are performed by a single entity (i.e., the columnar database management system 112). For example, the need to translate between different formats of the application frontend 110 and the columnar database management system 112 can be avoided, which may reduce delays. As another example, the number of requests required to generate a final set of data mining results may be reduced, which may minimize processing delays (e.g., parsing, character encoding conversion, etc). In addition, the types of data mining operations embedded by the columnar database management system 112 can be optimized or geared towards column oriented database engines (e.g., the database engine 116), which can accelerate data mining calculations. Finally, the usage of a columnar database management system in the manner described allows the execution of data mining operations for large volumes of data.

Computer Architecture

Figure 2:
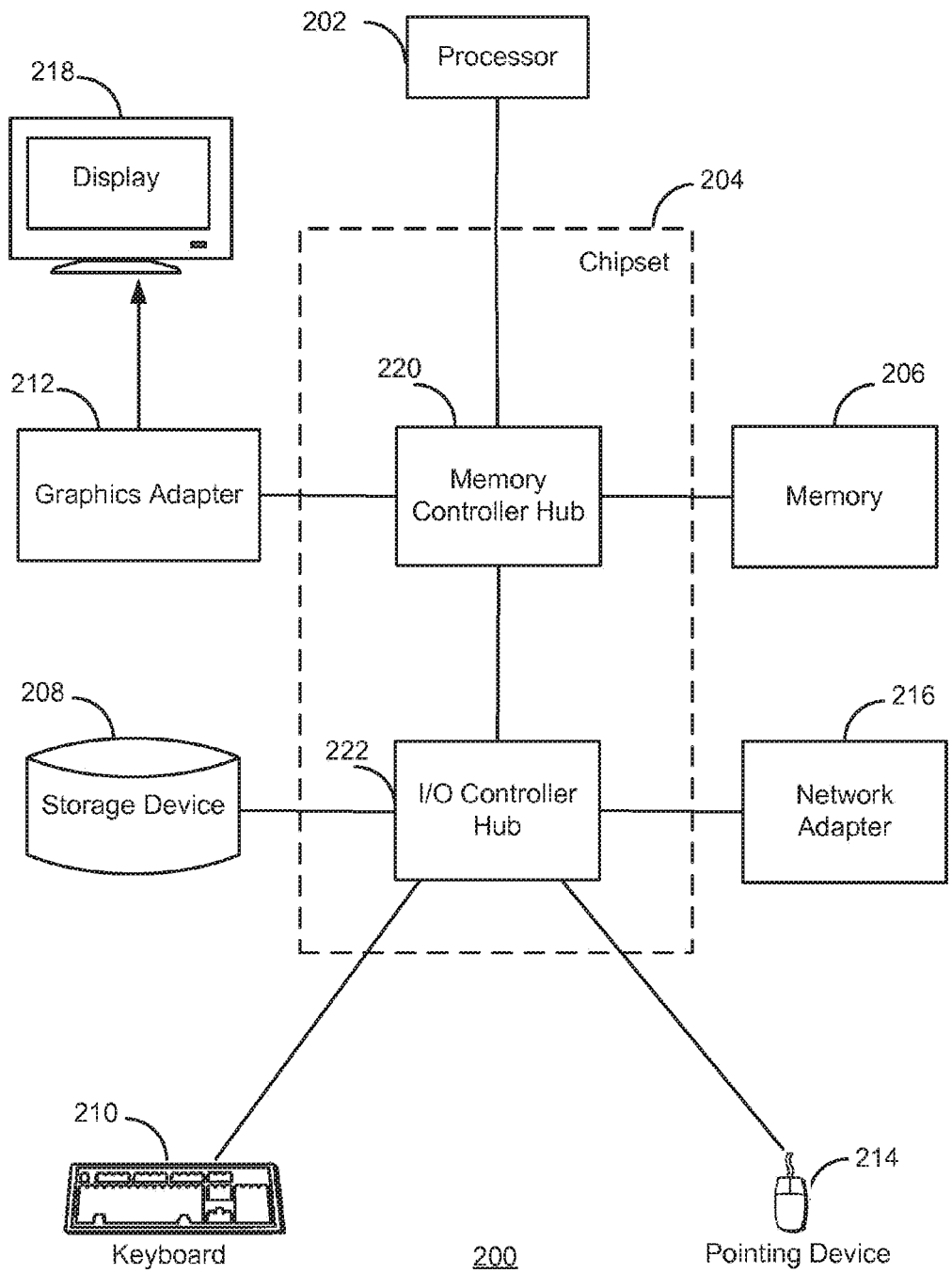
FIG. 2 is a high-level block diagram of a computer system for data mining according to one embodiment.

FIG. 2 is a high-level block diagram of a computer 200 for use as the client 105, data mining system 108, application frontend 110, or database management system 112 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of to the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 102.

A computer 200 can have different and/or other components than those shown in FIG. 2. In addition, the computer 200 can lack certain illustrated components. In one embodiment, a computer 200 acting as the data mining system 108 is formed of multiple blade computers and lacks a keyboard 210, pointing device 214, graphics adapter 212, and/or display 218. Moreover, the storage device 208 can be local and/or remote from the computer 200 (such as embodied within a storage area network (SAN)).

The computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Overall Process

Figure 3:
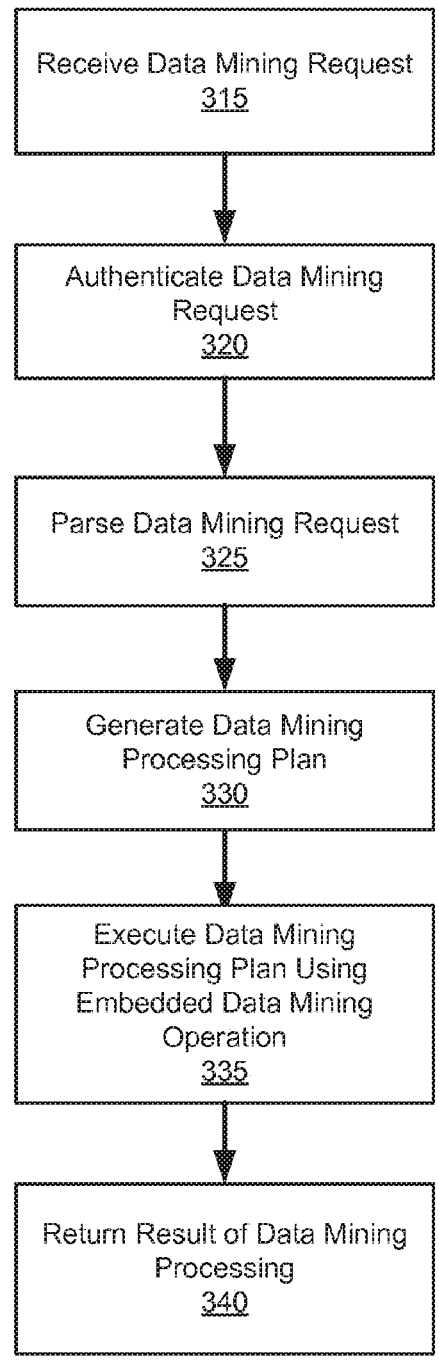
FIG. 3 is a flow chart illustrating a method of performing processing using data mining operations by a columnar database management system according to one embodiment.

FIG. 3 is a flowchart illustrating a method for performing data mining according to one embodiment. Other embodiments can perform the steps of the method in different orders and can include different, additional and/or fewer steps. The method shown in FIG. 3 can be performed by the columnar database management system 112.

In particular, the columnar database management system 112 includes the module data mining operations 115. As will be discussed, the data mining operations 115 may be applied to the stored data 114 in order to generate data mining results. Examples of the data mining operations 115 may include cross tabulation process, Venn diagram generation, profile finding processes, decision tree algorithms, association rule algorithms, clustering algorithms, time series algorithms, neural network algorithms, support vector machine related algorithms, Bayesian network related algorithms, etc.

In one embodiment, the data mining operations 115 may be implemented as one or more database entities within the data management system 112. As used herein, a database entity may refer to an abstraction of a process or data structure of a database that includes a bundling of a state and a set of properties and behaviors. By having the data mining operations 115 implemented as database entities, the data management system 112 enables one data mining algorithm 115 to leverage another data mining algorithm according to the structure of the data management system 112. For example, a decision tree training algorithm (a supervised algorithm that classifies data records into defined groups based on data record attributes) may leverage an internal entity for a cross tabulation algorithm to perform calculations, where the calculations are used by the decision tree training algorithm.

Referring to FIG. 3, the data management system 112 directly receives 315 a data mining request from the client 105 or receives a forwarded data mining request from the application frontend 110. The received data mining request may include any suitable information relevant for the requested data mining operation. In one aspect, the data mining request is a message that contains a description of requested calculations, information about data to be processed, and execution parameters needed to perform the calculations.

The data mining request may additionally include authentication information associated with the client 105, such as a username, password, authorization code, etc. As a specific example, a received data mining request may include a unique identifier specifying a particular set of data items to be processed. The data mining request may also include a unique identifier for a cross tabulation algorithm internally implemented by the data management system 112. The received data mining request may moreover include a username and password for a user associated with the client 105.

As another specific example, a received data mining request may request performance of a search for sets of records by similarity (clustering). In such a case, the request may contain an identifier for a data mining algorithm 115 corresponding to the search, a definition or identification of data records (i.e., data items) of the data 114 to be processed, the number of record clusters to be generated, and other relevant parameters, such as sensibility data, thresholds, etc.

In one aspect, the data mining request can be encapsulated in a suitable message format. For example the data mining request may be encapsulated in a suitable text format, such as XML, or in any other format. In some embodiments, the data mining request is received by the columnar database management system 112 via one or more suitable network transfer protocols. In other embodiments, the data mining request is received via an application programming interface (API) call, through receipt of a file containing the data mining request, or via an interactive console. It will be appreciated, however, that other ways of receiving the data mining request may be used. In one embodiment, an audit log associated with the columnar database management system 112 may be updated to indicate the received data mining request. At a later time, such an audit log may be retrieved from the columnar database management system 112 for review by an authorized user.

After receiving the data mining request, the database engine 116 of the columnar database management system 112 performs various stages of processing on the data mining request. Such stages may include, in one embodiment, an authentication stage, a parsing stage, a planning stage, and an execution stage.

In one embodiment, the database engine 116 authenticates 320 the received data mining request. The database engine 116 may authenticate the data mining request by determining whether authentication information included in the data mining request is valid. For example, the database engine 116 may authenticate the data mining request by checking the authentication information against information (e.g., usernames and passwords) for a set of authenticated clients stored by the database engine 116. The database engine 116 can further determine whether the client 105 or a user of the client 105 is authorized to request processing of data stored by the columnar database management system 112. Illustratively, the database engine 116 can verify and authorize actions requested by the data mining request (functionalities) as well as verify and authorize access to data items (database objects, records and others) needed by the actions.

The database engine 116 may perform such verification and authorization processes by accessing various access control lists (ACLs) and/or other access control related data corresponding to the data items and/or requested actions.

Following authentication, the database engine 116 parses 325 the data mining request. Parsing is the process of transforming a data mining request to content types that the database engine 116 can process. Parsing can include, but is not limited to, character encoding conversion, endianness adaptation, type conversion, and adaption of an external layer to a symbolic layer. For example, a Venn diagram calculation may be requested by a data mining request. The data mining request may be formatted as a character string. In parsing the data mining request, the database engine 116 processes the character string and identifies that a Venn diagram calculation is requested. Responsive to the identification, the database engine 116 internally creates a Venn object entity (an entity representing an external Venn diagram definition in a symbolic layer) for processing.

After parsing the data mining request, the database engine 116 generates 330 a data mining processing plan for processing of the data items specified by the data mining request. In one embodiment, such planning may be based on the data mining operations 115 and/or the data items of the data 114 specified by the data mining request. During planning, the database engine 116 identifies one or more data mining operations 115 to be used to process data items from the data 114. The identified data mining operations 115 may be directly specified by the data mining request and/or determined based on data mining operations 115 indicated by the data mining request. For example, the data mining request may indicate that a first data mining operation be used to process a set of data items. Based on the data mining request, the database engine 116 may determine that other data mining operations must also be used to process the set of data items. In some instances, the database engine 116 may determine that other data mining operations must be applied to the set of data items before the data mining operations indicated by the data mining request can be used to process the data items.

Illustratively, the database engine 116 may determine that the output or result of another data mining algorithm not specified by the data mining request is to be used as the input for a data mining operation indicated by the data mining request. As a specific example, the database engine 116 may receive a data mining request requesting that a decision tree algorithm be applied to classify data items (e.g., data records) into various groups. Based on the request, the database engine 116 may determine that a cross tabulation algorithm may be needed to also process the data items. After determining that the cross tabulation algorithm is needed, the database engine 116 may generate a set of results by applying the cross tabulation algorithm to the data items. This set of "intermediate" results may not, however, be returned or provided to the application frontend 110. Rather, the results may be used as the input for the decision tree algorithm performed by the database engine 116.

Determination of any data mining operations 115 required to process a data mining request may be performed in any suitable manner. For example, based on a data mining operation 115 specified by the data mining request, the database engine 116 may access an internally stored table or some other data structure of the columnar database management system 112 to identify any other data mining operations 115 that are needed to successfully complete processing of the data mining request.

In some embodiments, the database engine 116 may additionally acquire one or more resources needed for processing the data items indicated by the data mining request. In one aspect, the acquisition of resources may include ensuring the availability of the data items in order to guarantee the correct execution of the identified data mining operations. Acquisition of the data may additionally include other procedures.

For example, in acquiring data, the database engine may perform a memory pre-allocation procedure. In performing the memory pre-allocation procedure, the database engine 116 determines an exact or range of memory required to execute a data mining algorithm. If a determination cannot be made, the database engine 116 estimates the amount of memory needed based on any suitable criteria, such as the amount of memory used in the past for similar processing based on the data mining algorithm. Following determination or estimation of the amount of memory, the database engine 116 performs a negotiation procedure with a memory manager of the data mining system 108 in order to have the required amount of memory pre-allocated.

As another example, the database engine 116 may perform a storage pre-allocation procedure. In performing the storage pre-allocation procedure, the database engine 116 determines an exact or range of storage needed to perform a data mining algorithm and/or store data related to the data mining algorithm (e.g., intermediate and end results). If a determination cannot be made, the database engine 116 estimates the amount of storage needed based on any suitable criteria, such as the amount of storage required in the past for similar processing based on the data mining algorithm. After determining or estimating the amount of required storage, the database engine 116 performs a negotiation procedure with a disk manager of the data mining system 108 to have the required amount of storage allocated.

As yet another example, the database engine 116 may perform a pre-allocation procedure for physical and logic layer objects required for performance of a data mining algorithm. In performing the pre-allocation procedure, the database engine 116 performs a lookup into a repository object dictionary of the data mining system 108 to identify objects required by a data mining algorithm for processing. Based on the information in the repository object dictionary, the database engine 116 performs a negotiation procedure with a repository manager of the data mining system 108 to reserve the identified objects for usage in performance of the data mining algorithm.

In addition to acquiring data, the database engine 116 may, in some embodiments, furthermore perform various orchestration tasks (e.g., performing lock control, concurrency control, integrity control, queue management, etc.). For example, the database engine 116 performs a lock control procedure. Specifically, the database engine 116 may, for any atomic operations of a data mining algorithm, lock one or more objects needed in the operations. In one embodiment, if locking of an object fails, then the operation as a whole may fail, and such a failure may be indicated to the client 105. In other embodiments, the database engine 116 may perform one or more remedial measures to enable an operation to proceed even where locking of any required objects have failed.

As another example, in one embodiment, the database engine 116 performs a concurrency control procedure. Specifically, the database engine 116 may assign different levels of priority for different execution threads of a data mining operation depending on predefined importance or complexity values for operations that the threads are performing. For example, based on the predefined importance value or complexity value corresponding to an operation of a thread, the database engine 116 may prioritize the thread ahead of other threads for processing. In this way, the thread may be completed before the other threads, be allocated more computing resources, and/or the like.

As still another example, in one embodiment, the database engine 116 performs queue management procedure. In particular, the database engine 116 may maintain one or more execution queues. In the event a particular operation of a data mining algorithm cannot be currently completed, the database engine 116 inserts the operation into one or more of the execution queues. At a later time, the database engine 116 determines whether the operation may be completed based on a suitable set of criteria. For example, the database engine 116 may determine that an operation can be completed after determining that computing resources necessary to complete the operation are available. After making such a determination, the database engine 116 removes the operation from the execution queues and performs the operation.

In one embodiment, orchestration tasks may also include coordination of the data items and the data mining operations that are to be applied to data. For example, the database engine 116 may determine the order of execution for different parts of the identified data mining operations as well as determine an execution duration, any execution parallelization, and/or any execution synchronism.

In one embodiment, for instance, the database engine 116 determines the execution duration of a data mining algorithm based on one or more parameters, such as the durations for previous executions of the data mining operation, currently available resources, a current concurrency condition, a current data volume, etc. Illustratively, based on an average duration of previous executions, the database engine 116 determines that a particular data mining operation or a step within the data mining operation may take approximately 30 seconds to complete. The estimates of duration of the data mining operations may be used for optimizing the execution or various data mining operations, scheduling the execution of various data mining operations, for allocating resources to the operations, and so on. In an embodiment, the estimates of the duration of various data mining operations are used for modifying the execution of the various steps of a data mining processing plan to generate an optimized data mining processing plan.

In one embodiment, the database engine 116 performs a parallelization procedure. Specifically, the database engine 116 determines whether a data mining algorithm can be executed in parallel. For example, the database engine 116 may determine that a data mining algorithm can be broken into several operations that may be executed at the same time or substantially the same time. As another example, the database engine 116 may determine that a data mining algorithm can be executed at the same time or substantially the same time as another data mining algorithm. Such a determination may be made based on the current resource utilization of the system, characteristics of the particular data mining operations, dependencies associated with the data mining operations, etc. For instance, the database engine 116 may determine that a particular operation of a data mining algorithm cannot be executed at the same time as a second operation because the first operation requires the output of the second operation for processing.

In one embodiment, the database engine 116 performs a synchronization procedure. In particular, the database engine 116 may determine those resources that must be shared across different executing data mining operations and/or operations. Based on the determination, the database engine 116 may synchronize processing using the resources such that the execution of the data mining algorithms and/or operations can be successfully completed. The database engine 116 may also synchronize processing of the data mining algorithms and/or operations such that results of the processing can be timely delivered and/or coordinated.

In performing one or more of the above mentioned procedures, the database engine 116 generates 330 the data mining processing plan. The generated plan may include the data and processes or algorithms to be used, the ordering in which the data algorithms are to be executed, the resources to be used during execution, a coordination of the data algorithms and resources to be used, etc. Following generation of the plan, the database engine 116 executes 335 the generated data mining processing plan. In some embodiments, the plan for various data mining operations comprises executable code that is available as software modules in the data mining system 108. The executable code is loaded and executed in response to a request to execute a particular operation.

In particular, the database engine 116 processes the data items indicated by the data mining request using the identified data mining operations 115 according to the plan. For example, the database engine 116 may execute the data mining operations 115 according to an execution order indicated by the plan. Following the execution, the database engine 116 returns 340, in one embodiment, the data mining result to the requesting client 105. In another embodiment, the database engine 116 returns the data mining result to the application frontend 110, which provides the data mining result to the requesting client 105.

In some embodiments, the application frontend 110 may supplement the data mining result with additional information. For example, the application frontend 110 may retrieve data that supports or explains the data mining result. Such data may be retrieved from information stored by the application frontend 110, or retrieved from one or more third-party data sources. The application frontend 110 may additionally format or organize the data mining result such that the data mining result can be displayed to a user of the client 105.

Example Overview

As an example, the database engine 116 may receive a data mining request from a client 105 indicating that a decision tree algorithm be applied to data items stored by the columnar database management system 112. Responsive to the request, the database engine 116 authenticates and parses the request. The database engine 116 may additionally internally generate a plan to process the data items indicated by the data mining request. For instance, the database engine 116 may identify any supplemental or additional data mining operations that are needed to complete the data mining request. For example, the database engine 116 may determine that a cross-tabulation algorithm and a statistical algorithm may be required to process the data mining request. As such, the database engine 116 retrieves an entity for the cross-tabulation algorithm and an entity for the statistical algorithm.

The database engine 116 may also determine an ordering in which the data items are to be processed using the data mining operations. The database engine 116 additionally acquires the data items indicated by the data mining request. Retrieval of the data items may include, for example, determining that the client 105 is authorized to request processing of the data items, reading the data items, and locking the data items. Thereafter, the database engine 116 internally executes the plan, and generates a set of results. For example, for each attribute specified by a record (e.g., a data item) used as an input, the database engine 116 calculates (step 1) the normalized information gain of the attribute by using a cross tabulation entity or a statistical entity depending on data type and distribution. Generally, information gain refers to the amount of information gained about a random variable or signal from observing another random variable. Information gain calculation is known to those skilled in the art and thus is not further described herein.

Thereafter, the database engine 116 selects (step 2) the attribute with the highest gain. Subsequently, the database engine 116 creates (step 3) a decision node that splits the best attribute by creating as many leaves as discrete values it has. Lastly, for each child node, the database engine 116 repeats steps 1-3 until no attributes are left or all records belong to the same classifier. The results generated by the database engine 116 may be returned to the client 105. As with the previous example, the application frontend 110 does not take part in the generation of the set of results.

In an embodiment, performing a cross tabulation operation generates a result in the form of multiple rows. Each row of the result has one or more attribute values of input columns. Each row of the result data is processed as follows. The data mining system 108 identifies data of input sets having the attribute values corresponding to the row. The data mining system 108 determines an intersection set of the identified data. The data mining system 108 determines the output value for the combination of result based on the intersection set. The result of the cross tabulation may either be provided to a subsequent step of another data mining operation or sent to a requestor.

In one embodiment, the database engine 116 performs the following process to perform a cross-tabulation calculation. The columnar database management system 112 receives a request to perform a cross-tabulation operation on a set of database tables. The request may be received by the application front end 110 from a client 105 and sent to the columnar database management system 112. The request specifies one or more row dimensions representing columns of the database tables participating in the cross tabulation operation.

The database engine 116 of the columnar database management system 112 determines the result of cross tabulation and stores the results. The result of the cross tabulation operation comprises rows, each row having a combination of values of row dimensions. In an embodiment, the columnar database management system 112 sends the results, for example, to the client 105 sending the request.

The database engine 116 performs the following processing for each row of the result for the cross tabulation operation. Each row of the result is associated with a combination of values for different row dimensions. The database engine 116 determines a domain for each value of a row dimension of the combination. Each domain comprises a set of table records of the table matching the value of the row dimension. The database engine 116 determines an intersection set of domains corresponding to the row combination. The intersection set comprises table records that match the combination of values corresponding to the row. The database engine 116 determines one or more result columns for the row combination, for example, an aggregate value based on the intersection set. The database engine 116 may either store the rows of the result of the cross tabulation as data 114 or return the result to the requestor.

In some embodiments, the cross tabulation specification includes one or more filters. A filter specifies certain criteria that must be satisfied for the records considered for cross tabulation. The database engine 116 determines a filter domain for the filter value. The filter domain comprises a set of values that satisfy the filter value for the filter column of the table. The bubbler module 117 determines an intersection set of the filter domain with domains corresponding to a row combination.

In some embodiments, the cross tabulation request specifies pivot dimensions. A pivot dimension may correspond to a column of an input table. The result of the cross tabulation with pivot dimension includes a column for each distinct value of the specified column. To determine the result values of the pivot dimension, the database engine 116 determines a pivot domain for each value of the pivot dimension. The pivot domain comprises a set of records that satisfy the corresponding value for the column of the table. The bubbler module 117 determines an intersection set of the pivot domain with domains corresponding to values of row dimensions for the row combination. The operator module 118 determines an aggregate value based on the intersection set as a value of the measure, for example, count.

Figure 4A:
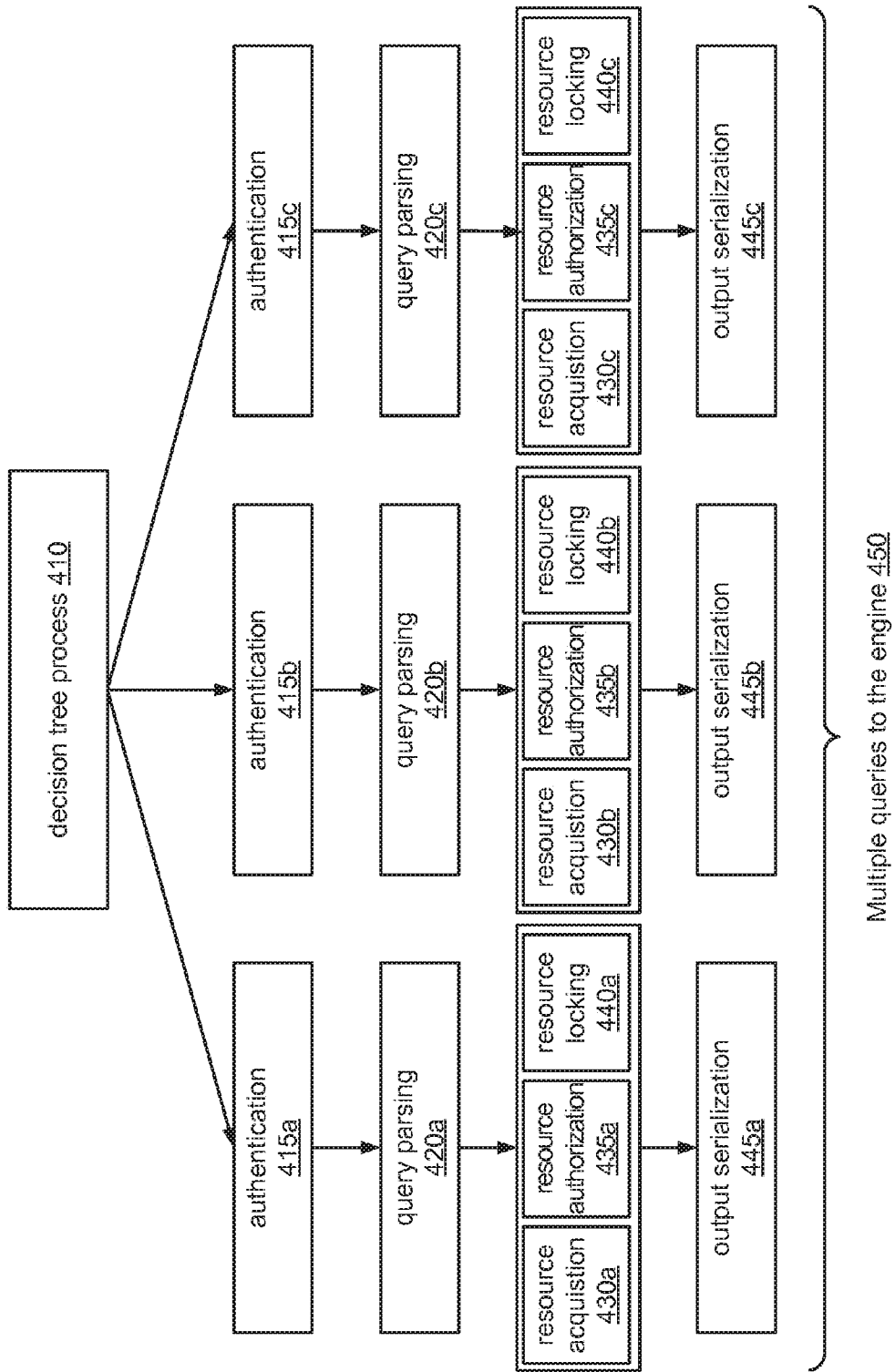
FIG. 4A is a diagram of an example process for performing data mining without using data mining operations internalized by a columnar database management system, according to one embodiment.

FIG. 4A shows a process performed by a data mining system where data mining operations used outside of a database engine of a columnar database management system. Specifically, an application frontend of the data mining system performs a decision tree algorithm. In order to generate results, the application frontend performs multiple queries to the columnar database management system 112 to retrieve data for processing. Because the columnar database management system 112 and the application frontend are logically separate entities, data retrieval is performed in a standard fashion. As such, a separate authentication stage and a separate parsing stage (among others) must be performed for each individual data retrieval procedure. As a consequence, the generation of data mining results may experience unnecessary delays.

For example, as shown in FIG. 4A, the decision tree process 410 sends multiple requests to the database engine 116. Each request results in an independent authentication step 415 and requires a query parsing step 420. Each request causes the database engine to perform orchestration operations, for example, resource acquisition 430, resource authorization 435, and resource locking 440. Furthermore each request to the database engine computes the output corresponding to the request and performs output serialization step 445 and sends the result to the requestor, for example, the client device sending the request.

Figure 4B:
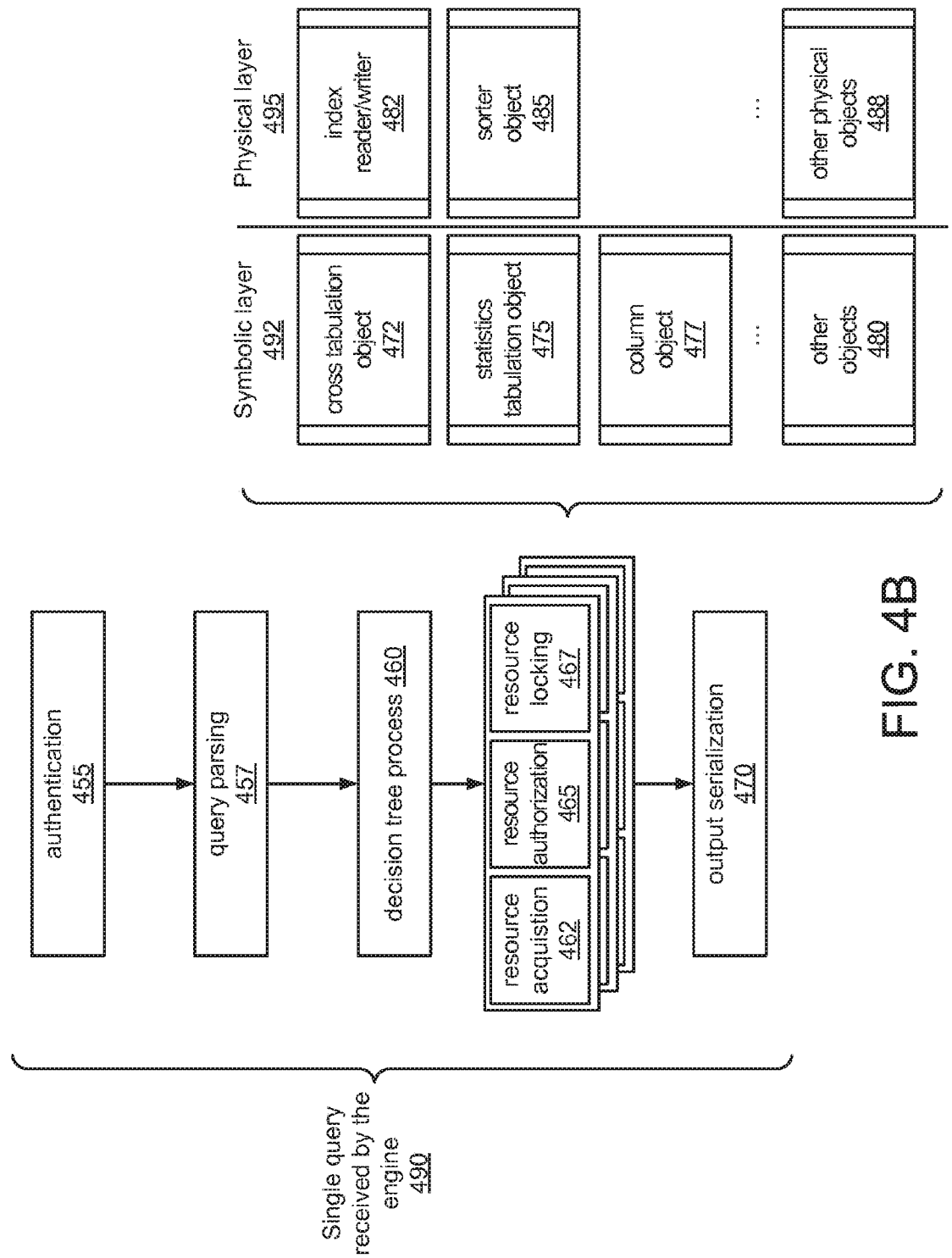
FIG. 4B is a diagram of an example process for performing data mining using data mining operations internalized by a columnar database management system, according to one embodiment.

In contrast, FIG. 4B shows a process performed by a data mining system including data mining operations that are internalized by a columnar database management system of the data mining system. A single query is received 490 by the database engine. As shown, only a single authentication 455 and query parsing 457 stage is required even where multiple data retrievals are performed. Such is the case because processing is performed by the same logical entity (i.e., the columnar database management system) that stores the data. The database engine 116 performs the decision tree process 460 for the single query received. The orchestration steps are performed for the single query, for example, resource acquisition 462, resource authorization 465, and resource locking.

Several objects may be processed during the processing of the query. Certain objects are represented in a symbolic layer 492 and other objects are represented in the physical layer 495. For example, the symbolic layer 492 includes cross tabulation object 472 for performing cross tabulation operations, statistics tabulation object 475 for performing statistics tabulation, column object 477 to represent a set of data stored as a column, and other objects 480. The objects in the physical layer 495 include index reader/writer 482 for performing read/write operations for an index, sorter object 485 for sorting data being processed, and other physical objects 488. The output serialization 470 is performed for the single query request and the result sent to the requestor. Since a single query processes the data mining request, several steps, for example, authentication 455, query parsing 457, As a result, the performance of the data mining system shown in FIG. 4B is faster and more efficient than the performance of the data mining system shown in FIG. 4A.

As another example, the database engine 116 may internally perform calculation of a two segment Venn diagram. In the example, the database engine 116 receives a data mining request from a client 105. The request may indicate that a Venn diagram algorithm be applied to a first column of data and a second column of data stored by the columnar database management system 112. Responsive to the request, the database engine 116 authenticates and parses the request. The database engine 116 additionally reads the first column and the second column of the columnar database management system 112 indicated by the data mining request.

The database engine 116 furthermore identifies an entity for the Venn diagram algorithm internally maintained by the columnar database management system 112. Thereafter, the database engine 116 internally performs a comparison between the first column and the second column. Based on the comparison, the database engine 116 generates three separate sets of results. The three separate sets of results are then returned to the client 105. In the example, the application frontend 110 does not take part in the generation of the three separate sets of results.

If the Venn diagram receives multiple input sets as input, various set operations are performed for generating the Venn diagram. In an embodiment, the data mining system stores the data of the input sets and the request to generate a Venn diagram includes information identifying the input sets. The process of generating Venn diagrams using columnar databases orders the various steps of the computation such that data loaded for performing a step is reused by subsequent steps if possible.

Figure 5:
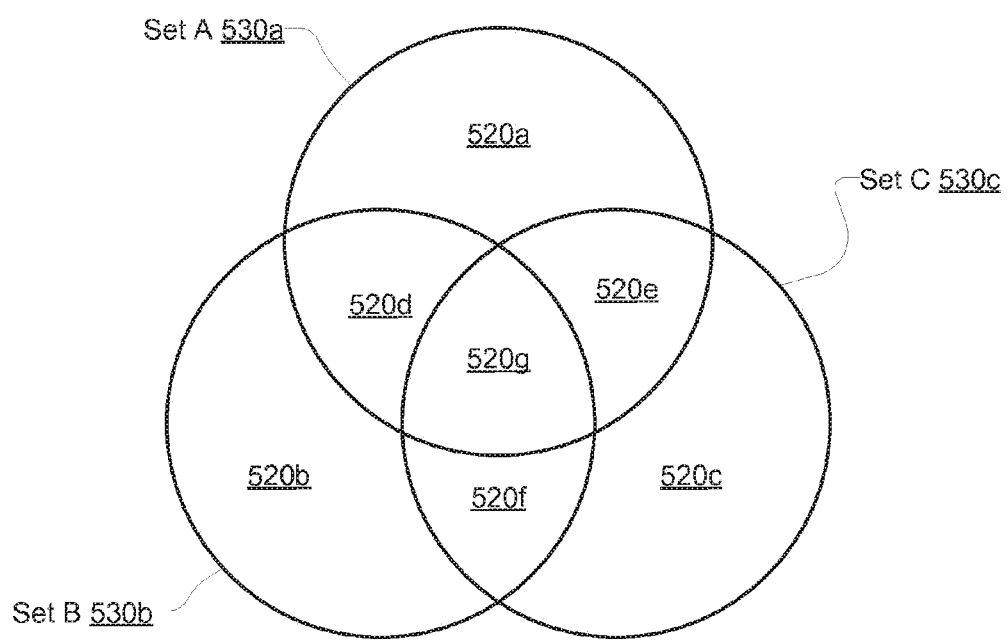
FIG. 5 shows an example of a Venn diagram based on three input sets for illustrating the process of Venn diagram generation according to an embodiment.

FIG. 5 shows an example of a Venn diagram based on three input sets for illustrating the process of Venn diagram generation according to an embodiment. The data mining system 108 receives a plurality of input sets of data for generating a Venn diagram. In an embodiment, the columnar database management system 112 stores the input sets in a columnar format that stores data of a column adjacent to each other on a secondary storage device. Accordingly, an input set can be loaded (i.e., retrieved from the secondary storage for processing) without having to load data of the other input sets. The data mining system 108 determines intersections of various combinations of the input sets. For example, if the input data sets are 530a, B, and 530c, the various combinations of intersections are (530a∩530b), (530b ∩530c), (530a∩530c), and (530a∩530b∩530c).

The data mining system 108 orders the computations of the intersections of sets such that the data used for determining an intersection of a combination is used for determining the intersection of the next combination. For example, if data for set 530a is loaded, the intersection (530a∩530b) may be determined next since this intersection uses the data of set 530a that is already loaded. Once the intersection of data set (530a∩530b) is determined, the data mining system 108 may determine the intersection of (530a∩530b∩530c) since performing this operation requires sets 530a and 530b that are already loaded.

The data mining system 108 determines the various subsets of the Venn diagram by computing appropriate set differences of the intersection sets or subsets of Venn diagram previously computed. For example, the subset 520d of the Venn diagram is determined by computing the set difference of intersection set (530a∩530b) and the intersection set (530a∩530b∩530c). Similarly, the subset 520e of the Venn diagram is determined by computing the set difference of intersection set (530a ∩530c) and the intersection set (530a∩530b∩530c). Similarly, the subset 520f of the Venn diagram is determined by computing the set difference of intersection set (530b∩530c) and the intersection set (530a∩530b∩530c).

Furthermore, subset 520a is computed by computing the set difference of set 530a and a union of subsets 520d, 520e, and 520g. Subset 520b is computed by computing the set difference of set 530b and a union of subsets 520d, 520f, and 520g. Subset 520c is computed by computing the set difference of set 530c and a union of subsets 520e, 520f, and 520g.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible non-transitory computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of performing data mining operations in a database system, the method comprising:
    receiving, by a data mining system from a client device over a network, a request for a data mining operation, the data mining system having a columnar database management system, the columnar database management system having a database engine;
    parsing, by the database engine, the request for the data mining operation, the request specifying data items for the data mining operation;
    determining, by the database engine based on the parsing, an internal data mining operation necessary for processing the request for the data mining operation, the internal data mining operation not specified by the request for the data mining operation;
    determining, by the database engine, an order in which the data items are to be processed using the data mining operation specified by the request and the internal data mining operation not specified by the request;
    generating, by the database engine based at least in part on the order in which the data items are to be processed, a data mining processing plan, the data mining processing plan including the data mining operation specified by the request and the internal data mining operation not specified by the request, the internal data mining operation implemented as a database entity within the columnar database management system;
    executing, by the database engine, the data mining processing plan, the executing comprising performing the internal data mining operation and the data mining operation in accordance with the order, wherein the internal data mining operation generates an output or result and wherein the data mining operation uses the output or result from the internal data mining operation as input and generates a data mining result, wherein the executing further comprises:
        calculating a normalized information gain for each respective attribute of a set of attributes specified by a data item of the data items by using a cross tabulation entity or a statistical entity depending on data type and distribution;
        from the set of attributes specified by the data item, selecting a best attribute based on the normalized information gain calculated by the database engine; and
        creating a decision node for a decision tree, the decision node representing the best attribute; and
    returning, by the data mining system to the client device over the network, the data mining result for presentation on the client device.

2. The method according to claim 1, wherein the database engine is adapted for processing data stored by the columnar database management system and for performing data mining using the data and data mining operations implemented as database entities within the columnar database management system.

3. The method according to claim 1, further comprising:
    retrieving the database entity for the internal data mining operation not specified by the request.

4. The method according to claim 1, wherein the data mining operation specified by the request comprises a decision tree for classifying the data items and wherein the internal data mining operation not specified by the request comprises a cross tabulation algorithm.

5. The method according to claim 1, wherein
    the creating including creating child nodes.

6. The method according to claim 5, wherein each child node of the child nodes represents a discrete value of the respective attribute.

7. The method according to claim 5, further comprising:
    for each child node of the child nodes, iteratively performing the calculating, the selecting, and the creating until no attributes are left or until all data items belong to same class.

8. A data mining system, comprising:
    a processor;
    a non-transitory computer-readable medium; and
    stored instructions translatable by the processor for:
        receiving, from a client device over a network, a request for a data mining operation, the data mining system further comprising a columnar database management system, the columnar database management system having a database engine;
        parsing, by the database engine, the request for the data mining operation, the request specifying data items for the data mining operation;
        determining, by the database engine based on the parsing, an internal data mining operation necessary for processing the request for the data mining operation, the internal data mining operation not specified by the request for the data mining operation;
        determining, by the database engine, an order in which the data items are to be processed using the data mining operation specified by the request and the internal data mining operation not specified by the request;
        generating, by the database engine based at least in part on the order in which the data items are to be processed, a data mining processing plan, the data mining processing plan including the data mining operation specified by the request and the internal data mining operation not specified by the request, the internal data mining operation implemented as a database entity within the columnar database management system;
        executing, by the database engine, the data mining processing plan, the executing comprising performing the internal data mining operation and the data mining operation in accordance with the order, wherein the internal data mining operation generates an output or result and wherein the data mining operation uses the output or result from the internal data mining operation as input and generates a data mining result, wherein the executing further comprises:

calculating a normalized information gain for each respective attribute of a set of attributes specified by a data item of the data items by using a cross tabulation entity or a statistical entity depending on data type and distribution;

from the set of attributes specified by the data item, selecting a best attribute based on the normalized information gain calculated by the database engine; and creating a decision node for a decision tree, the decision node representing the best attribute; and returning, to the client device over the network, the data mining result for presentation on the client device.

9. The data mining system of claim 8, wherein the database engine is adapted for processing data stored by the columnar database management system and for performing data mining using the data and data mining operations implemented as database entities within the columnar database management system.

10. The data mining system of claim 8, wherein the stored instructions are further translatable by the processor for:

retrieving the database entity for the internal data mining operation not specified by the request.

11. The data mining system of claim 8, wherein the data mining operation specified by the request comprises a decision tree for classifying the data items and wherein the internal data mining operation not specified by the request comprises a cross tabulation algorithm.

12. The data mining system of claim 8, wherein
the creating including creating child nodes.

13. The data mining system of claim 12, wherein each child node of the child nodes represents a discrete value of the respective attribute.

14. The data mining system of claim 12, wherein the stored instructions are further translatable by the processor for:

for each child node of the child nodes, iteratively performing the calculating, the selecting, and the creating until no attributes are left or until all data items belong to same class.

15. A computer program product comprising a non-transitory computer-readable medium storing instructions translatable by a processor of a data mining system for:

receiving, from a client device over a network, a request for a data mining operation, the data mining system comprising a columnar database management system, the columnar database management system having a database engine;

parsing, by the database engine, the request for the data mining operation, the request specifying data items for the data mining operation;

determining, by the database engine based on the parsing, an internal data mining operation necessary for processing the request for the data mining operation, the internal data mining operation not specified by the request for the data mining operation;

determining, by the database engine, an order in which the data items are to be processed using the data mining operation specified by the request and the internal data mining operation not specified by the request;

generating, by the database engine based at least in part on the order in which the data items are to be processed, a data mining processing plan, the data mining processing plan including the data mining operation specified by the request and the internal data mining operation not specified by the request, the internal data mining operation implemented as a database entity within the columnar database management system;

executing, by the database engine, the data mining processing plan, the executing comprising performing the internal data mining operation and the data mining operation in accordance with the order, wherein the internal data mining operation generates an output or result and wherein the data mining operation uses the output or result from the internal data mining operation as input and generates a data mining result, wherein the executing further comprises:

calculating a normalized information gain for each respective attribute of a set of attributes specified by a data item of the data items by using a cross tabulation entity or a statistical entity depending on data type and distribution;

from the set of attributes specified by the data item, selecting a best attribute based on the normalized information gain calculated by the database engine; and creating a decision node for a decision tree, the decision node representing the best attribute; and returning, to the client device over the network, the data mining result for presentation on the client device.

16. The computer program product of claim 15, wherein the database engine is adapted for processing data stored by the columnar database management system and for performing data mining using the data and data mining operations implemented as database entities within the columnar database management system.

17. The computer program product of claim 15, wherein the instructions are further translatable by the processor for:

retrieving the database entity for the internal data mining operation not specified by the request.

18. The computer program product of claim 15, wherein the data mining operation specified by the request comprises a decision tree for classifying the data items and wherein the internal data mining operation not specified by the request comprises a cross tabulation algorithm.

19. The computer program product of claim 15, wherein the creating including creating child nodes.

20. The computer program product of claim 19, wherein each child node of the child nodes represents a discrete value of the respective attribute.

* * * * *